(12) United States Patent
Sambhwani et al.

(10) Patent No.: US 8,687,589 B2
(45) Date of Patent: Apr. 1, 2014

(54) NEIGHBOR CELL SEARCH ON A SECONDARY CARRIER

(75) Inventors: Sharad Deepak Sambhwani, San Diego, CA (US); Aziz Gholmieh, Del Mar, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 765 days.

(21) Appl. No.: 12/540,197

(22) Filed: Aug. 12, 2009

(65) Prior Publication Data

US 2010/0069065 A1 Mar. 18, 2010

Related U.S. Application Data

(60) Provisional application No. 61/111,262, filed on Nov. 4, 2008, provisional application No. 61/088,461, filed on Aug. 13, 2008.

(51) Int. Cl.
*H04L 12/26* (2006.01)

(52) U.S. Cl.
USPC .................... 370/331; 455/436; 370/334

(58) Field of Classification Search
USPC ......... 370/328, 329, 330, 331, 334, 335, 336, 370/337, 338; 455/436, 437, 438, 439, 442, 455/450, 451, 452.1, 524, 525
See application file for complete search history.

(56) References Cited

U.S. PATENT DOCUMENTS

| | | | |
|---|---|---|---|
| 7,020,226 B1 | 3/2006 | Kirkland | |
| 7,545,763 B2 | 6/2009 | Wunder et al. | |
| 8,165,026 B2 | 4/2012 | Gholmieh et al. | |
| 2006/0128312 A1 | 6/2006 | Declerck et al. | |
| 2007/0047552 A1 | 3/2007 | Astely | |
| 2007/0104174 A1 | 5/2007 | Nystrom et al. | |
| 2008/0151743 A1 | 6/2008 | Tong et al. | |
| 2008/0299985 A1 | 12/2008 | Yang et al. | |
| 2009/0270103 A1* | 10/2009 | Pani et al. | 455/436 |
| 2010/0222059 A1* | 9/2010 | Pani et al. | 455/436 |

FOREIGN PATENT DOCUMENTS

| | | |
|---|---|---|
| KR | 20080033966 A | 4/2008 |
| SU | 2314649 C2 | 1/2008 |
| TW | 200830895 A | 7/2008 |
| WO | WO2004073256 A1 | 8/2004 |
| WO | WO2004080102 A1 | 9/2004 |
| WO | WO2006086878 A1 | 8/2006 |
| WO | WO2007003122 | 1/2007 |

OTHER PUBLICATIONS

International Search Report and Written Opinion—PCT/US2009/053756—ISA/EPO—Dec. 3, 2009.

(Continued)

*Primary Examiner* — Dady Chery
(74) *Attorney, Agent, or Firm* — Charles Chesney (57) ABSTRACT

Systems and methodologies are described that facilitate providing frequent secondary carrier measurement reports in multicarrier wireless communications. Secondary carrier measurement reports can be provided based on anchor carrier measurement reports. When an event or request to generate an anchor carrier measurement report is received, the anchor carrier measurement report can be generated along with a secondary carrier measurement report. In this regard, access points can receive the carrier measurement reports and determine mobility for a wireless device based on more than one carrier.

28 Claims, 9 Drawing Sheets

(56) References Cited

OTHER PUBLICATIONS

Qualcomm Europe: "RRM requirements for DC-HSDPA", 3GPP Draft; R4-081353, 3RD Generation Partnership Project (3GPP), Mobile Competence Centre ; 650, Route Des Lucioles ; F-06921 Sophia-Antipolis Cedex ; France, vol. RAN WG4, no. Munich, Germany; 20080610, Jun. 10, 2008, XP050179943 [retrieved on Jun. 10, 2008] paragraph 2.

Qualcomm Europe: "Cell Search and Association with Carriers" 3GPP Draft; R2-084403, 3RD Generation Partnership Project (3GPP), Mobile Competence Centre; 650, Route Des Lucioles; F-06921 Sophia-Antipolis Cedex; France, no. Jeju; 20080812, Aug. 12, 2008, XP050319472 [retrieved on Aug. 12, 2008] paragraph 3 paragraph 4 Figures 1 and 2.

Taiwan Search Report—TW098127299—TIPO—Nov. 13, 2012.

Ericsson, "Additional measurements in RRC measurement messages," Change Request 25.331 CR 014rev1, Document TSGR2#9(99)h14m TSG-RAN Working Group 2, Sophia Antipolis, France, Nov. 29-Dec. 3, 1999.

Guo, "Advances in mobile radio access networks" Jan. 1, 2004, Artech, USA, XP002580182, pp. 84-88, paragraph [4.5.1]-paragraph [4.5.2].

Mitsubishi Electric: "Downlink Channel Quality Report Scheme", 3GPP Draft; R1-01-1055,3RD Generation Partnership Project (3GPP), Mobile Competence Centre ; 650, Route Des Lucioles ; F-06921 Sophia-Antipolis Cedex ; France, . vol. RAN WG1, no. Sophia Antipolis, France; 20020128, Jan. 28, 2002, XP050111076, [retrieved on Jan. 28, 2002].

\* cited by examiner

NEIGHBOR CELL SEARCH ON A SECONDARY CARRIER

CROSS-REFERENCE

This application claims the benefit of U.S. Provisional Application Ser. No. 61/088,461, filed Aug. 13, 2008, and entitled "NEIGHBOR CELL SEARCH ON A SECONDARY CARRIER," and U.S. Provisional Application Ser. No. 61/111,262, filed Nov. 4, 2008, and entitled "NEIGHBOR CELL SEARCH ON A SECONDARY CARRIER," the entireties of which are incorporated herein by reference.

BACKGROUND

I. Field

The present disclosure relates generally to wireless communications and more specifically to searching neighbor cells in multicarrier communications.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc., and can use one or more protocols, such as high-speed downlink packet access (HSDPA), single carrier HSDPA (SC-HSDPA), dual carrier HSDPA (DC-HSDPA), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, wireless communication systems can support communication over multiple frequency carriers such that an access point can transmit to and receive from mobile devices over multiple carriers for increased throughput. In one example, access points can utilize an anchor carrier for primary communication with mobile devices, as well as a secondary carrier to receive multicarrier downlink transmissions. Mobile devices can travel over a wireless network performing cell reselection to various access points to facilitate seamless wireless network access. In this regard, mobile devices can measure neighbor cell signals sent over the anchor carrier and send measurement reports related to the anchor carrier to a current access point, so the access point can determine when to initiate reselection to a neighbor cell (e.g., when signal-to-noise ratio is just as good or better than the current cell).

Anchor carrier measurement reports are generated and transmitted frequently to facilitate mobility through reselection, where there is no such requirement for secondary carriers. Access points can, however, switch an anchor carrier for a mobile device to the secondary carrier (e.g., to facilitate load balancing, where the secondary carrier has higher signal-to-noise ratio, etc.). In this regard, measurement reports may not be regularly received for the previous anchor carrier, which can be the anchor carrier for surrounding access points or related cells. This can inhibit mobility where surrounding access points use the previous anchor carrier for their anchor carrier.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating providing measurement reports related to secondary carriers to access points along with or otherwise based on providing anchor carrier measurement reports. For example, for each anchor carrier measurement report request or event related to an access point, a mobile device can perform and transmit a measurement report for a secondary carrier. Multicarrier wireless devices can be equipped with multiple receivers to simultaneously communicate over the multiple carriers, and a receiver assigned to the secondary carrier can search for neighboring cells transmitting in the secondary carrier space in conjunction with or otherwise based on an anchor carrier receiver measuring neighboring signals over an anchor carrier to provide mobility with respect to both carriers. Aspects described herein can apply to downlink and/or uplink carriers.

According to related aspects, a method is provided that includes generating an anchor carrier measurement report for an anchor carrier assigned by one or more network devices related to quality of communications over the anchor carrier using a primary receiver. The method also includes generating a secondary carrier measurement report for a secondary carrier adjacent to the anchor carrier using a secondary receiver based at least in part on generating the anchor carrier measurement report. Furthermore, the method includes providing the anchor carrier measurement report and the secondary carrier measurement report to the one or more network devices.

Another aspect relates to a wireless communications apparatus. The wireless communications apparatus can include at least one processor configured to perform a cell measurement over an anchor carrier assigned for communicating with a network device. The at least one processor is further configured to perform a cell measurement over a secondary carrier adjacent to the anchor carrier based at least in part on performing the cell measurement over the anchor carrier and report the cell measurement over the anchor carrier and the cell measurement over the secondary carrier to the network device. The wireless communications apparatus also comprises a memory coupled to the at least one processor.

Yet another aspect relates to an apparatus. The apparatus includes means for generating a cell measurement over an anchor carrier assigned for communicating with a network device and means for generating a cell measurement over a secondary carrier based at least in part on the cell measurement over the anchor carrier. The apparatus further includes means for reporting the cell measurement over the anchor carrier and the cell measurement over the secondary carrier to the network device.

Still another aspect relates to a computer program product, which can have a computer-readable medium including code for causing at least one computer to generate an anchor carrier measurement report for an anchor carrier assigned by one or more network devices related to quality of communications over the anchor carrier using a primary receiver. The computer-readable medium can also comprise code for causing the at least one computer to generate a secondary carrier measurement report for a secondary carrier adjacent to the anchor carrier using a secondary receiver based at least in part on generating the anchor carrier measurement report. Moreover, the computer-readable medium can include code for causing at least one computer to provide the anchor carrier measurement report and the secondary carrier measurement report to the one or more network devices.

Moreover, an additional aspect relates to an apparatus including an anchor carrier measuring component that generates a cell measurement over an anchor carrier assigned for communicating with a network device and a secondary carrier measuring component that generates a cell measurement over a secondary carrier based at least in part on the cell measurement over the anchor carrier. The apparatus can further include a measurement reporting component that provides the cell measurement over the anchor carrier and the cell measurement over the secondary carrier to the network device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Figure 1:
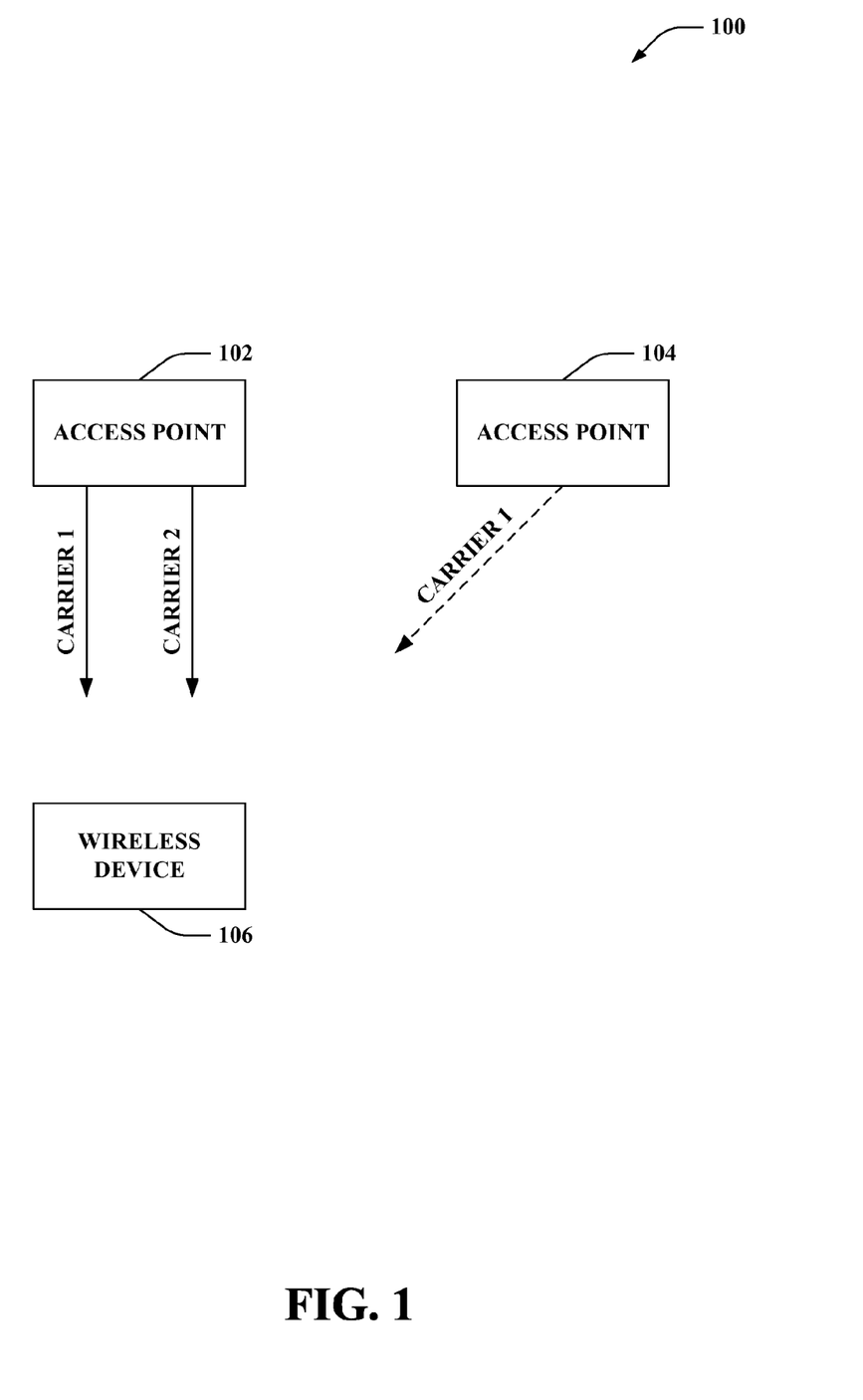
FIG. 1 is a block diagram of a system for providing frequent secondary carrier measurement reports.

Referring now to the drawings, FIG. 1 illustrates an example wireless network 100 that facilitates providing secondary carrier measurement reports with similar frequency as anchor carrier measurement reports. Access points 102 and 104 are provided, which can be macrocell access points, femtocell or picocell access points relay nodes, devices communicating in a peer-to-peer configuration, and/or the like, that provide wireless network access to wireless device 106 (and/or other devices). Wireless device 106 can be substantially any sort of device that can communicate in a wireless network, such as a mobile device, access point, relay node, etc., receiving access to the wireless network from access point 102 and/or 104.

According to an example, access point 102 can be communicating with wireless device 106 over carriers 1 and 2, which can be adjacent carriers, providing multicarrier access to the wireless device 106. In this example, carrier 1 can be an anchor carrier for access points 102 and 104 (and/or related sectors) that is used for primary communications with one or more devices. Access point 102 can communicate with wireless device 106 over the anchor carrier, carrier 1, and a secondary carrier, carrier 2, and wireless device 106 can receive communications over the carriers using multiple receivers. In one example, however, access point 102 can switch anchor carrier assignment designating carrier 2 as the anchor carrier for the wireless device 106 (and carrier 1 as a secondary carrier). This can be based at least in part on load balancing for the access point 102 or related sector, request from the wireless device 106, and/or the like.

Wireless device 106 can generate measurement reports for the anchor and secondary carriers to facilitate mobility over both carriers. For example, wireless device 106 can measure interference (e.g., signal-to-noise ratio (SNR), etc.) over the carriers and provide the measurement to access point 102. In one example, wireless device 106 can measure interference during certain time periods when the related receiver is not receiving a signal (e.g., when decoding or demodulating received signals, etc.). Wireless device 106 can further measure signals over the anchor carrier using one receiver and over the secondary carrier using another receiver at substantially the same time, at similar time intervals, in response to an event or request to measure relating to one of the carriers, etc. Thus, in one example, when wireless device 106 measures signals over the anchor carrier in response to a request from access point or an event triggered related to the access point, wireless device 106 can also measure signals, generate a measurement report, and/or transmit the measurement report, for the secondary carrier. This can be performed according to a wireless network specification, in one example. In 3GPP LTE, for example, cells can be measured using a physical hybrid automatic repeat/request (H-ARQ) indicator channel (PHICH).

In this regard, wireless device 106 transmits measurement reports related to the secondary carrier (e.g., carrier 1) at least as often as reports related to the anchor carrier (e.g., carrier 2). Thus, access point 102 can utilize reports for both carriers when assessing the reports for cell reselection. Even though carrier 1 is the secondary carrier, since frequent measurement reports are received by the access point 102 for the secondary carrier, access point 102 has updated information for reselecting to access point 104 on carrier 1 for wireless device 106 (which is the anchor and/or only carrier related to access point 104 in this example), thus enhancing mobility over both carriers. This can also mitigate need for the access point 102 and wireless device 106 to operate in compressed mode, where the access point 102 sends the data in a shortened period of time allowing the wireless device 106 to tune a receiver away from a respective frequency to acquire measurement reports for other frequencies utilized by access points.

Moreover, providing frequent measurement reports over both carriers can facilitate enhanced network deployment and optimization since SNR across multiple carriers can be observed and analyzed, improved dimensioning of wireless networks since SNR can be averaged for the carriers over a long period of time, creation of cell reselection algorithms based on measurements of both carriers (e.g., quality of communications or SNR over both carriers instead of merely one or the other), more accurate wireless device 106 positioning algorithms (e.g., triangulation or other algorithms based on received signal code power) using the multiple carriers, and/or the like. In addition, though described in context of downlink carriers, aspects described herein can be implemented for uplink carriers allowing wireless device 106 to maintain an active set. Furthermore, the concepts can be applied to more than two carriers, carriers that are not necessarily adjacent, and/or the like.

Figure 2:
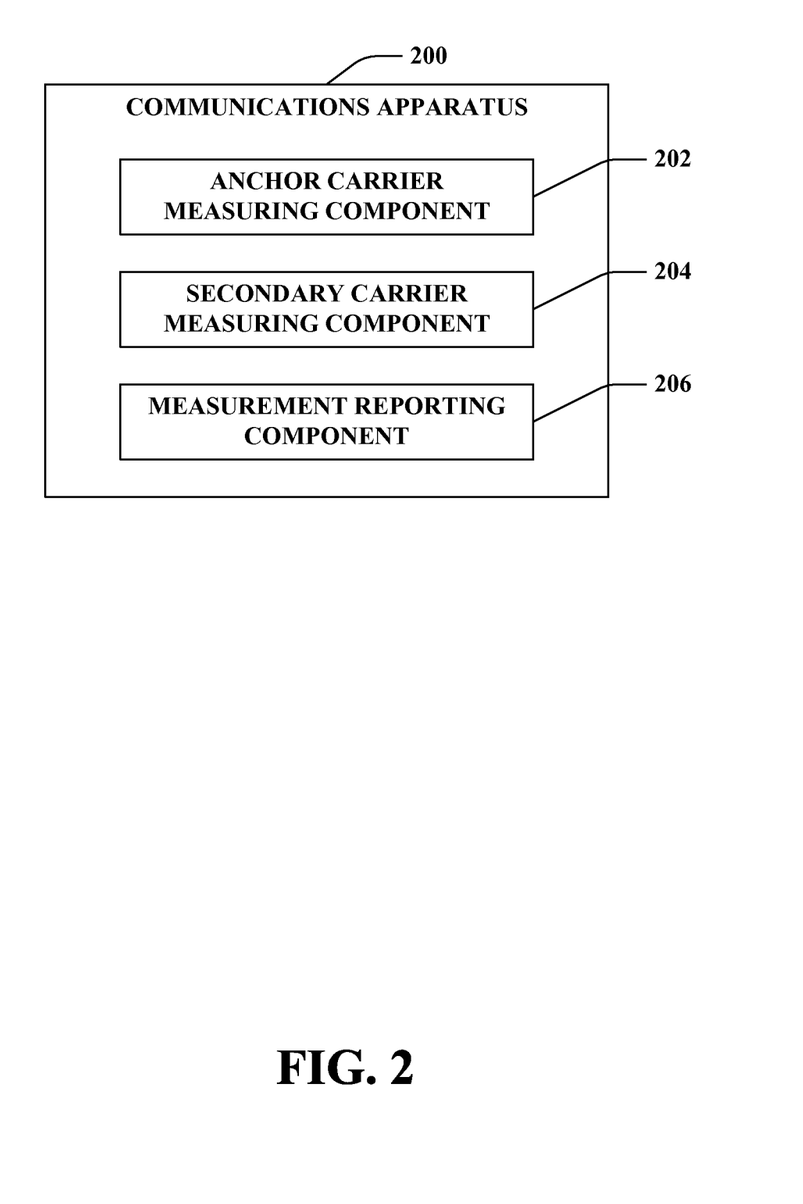
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can provide or receive access to a wireless network. The communications apparatus 200 can include an anchor carrier measuring component 202 that can generate a measurement report related to anchor carrier communications, a secondary carrier measuring component 204 that can create a measurement report related to secondary carrier communications, and a measurement reporting component 206 that can transmit the anchor carrier and secondary carrier measurement reports to an access point to facilitate mobility in a wireless network.

According to an example, the communications apparatus 200 can travel throughout a wireless network handing over communications to (or reselecting) cells to facilitate seamless network access while mobile. To facilitate such mobility, the communications apparatus 200 can report carrier measurements to one or more network components (not shown), and the one or more network components can determine when to reselect a different cell (e.g., when communications with the cell are optimal over a current cell). Furthermore, communications apparatus 200 can communicate in a multicarrier mode where it can simultaneously receive and/or transmit signals over multiple frequency carriers using disparate receivers and/or transmitters. In one example, the multiple carriers can be adjacent in frequency space.

In addition, communications apparatus 200 can communicate with a network component over an anchor carrier, which can be the primary carrier used for communication. This can mean, for example, that control transmissions or other sensitive data are transmitted over the anchor carrier. Communications apparatus 200 can also communicate with the network component over a secondary carrier to receive multicarrier access. As described, the communications apparatus 200 can be a mobile device and the network component can be an access point, and/or vice versa, such that concepts described herein can be applied to uplink and downlink communications. Anchor carrier measuring component 202 can perform intra-frequency measurements over the anchor carrier. Based on the anchor carrier measuring component 202 performing measurements, the secondary carrier measuring component 204 can similarly perform intra-frequency measurements over a secondary carrier.

As described, measurements performed by the secondary carrier measuring component 204 can be triggered by the event or request causing anchor carrier measuring component 202 to perform measurements, triggered upon request from anchor carrier measuring component 202, performed based in part on detecting measurement by the anchor carrier measuring component 202, and/or the like. Thus, in one example, secondary carrier measuring component 204 can detect or receive the event or request for anchor carrier measurement (e.g., from the anchor carrier measuring component 202, communications apparatus 200 or another component thereof, etc.). Measurement reporting component 206 can provide the measurement reports to a network component to facilitate mobility, as described above and further herein. Since current measurement reports are provided for the anchor and secondary carriers, mobility can be facilitated over both carriers.

Figure 3:
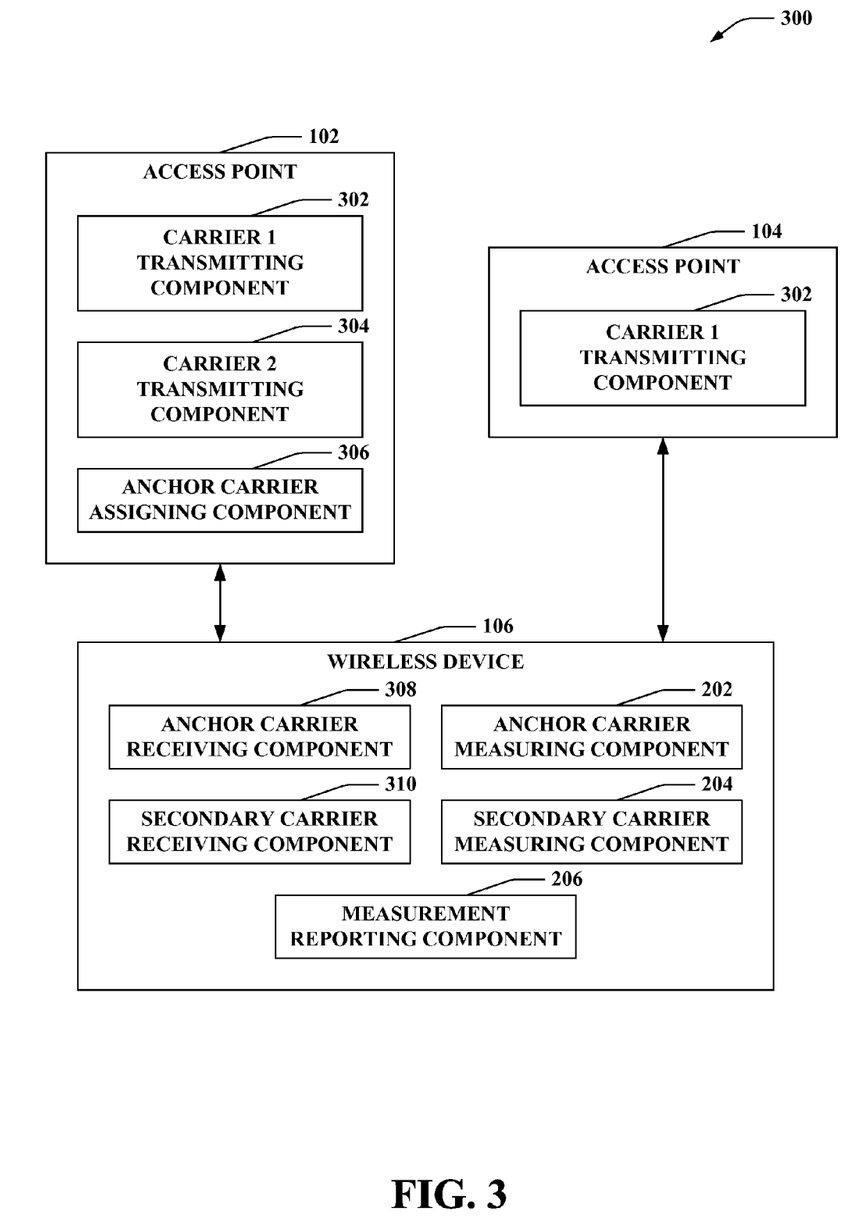
FIG. 3 illustrates an example wireless communication network that effectuates providing secondary carrier measurement reports along with anchor carrier measurement reports.

Now referring to FIG. 3, illustrated is a wireless communications system 300 that facilitates providing frequent anchor and secondary carrier measurement reports. Access points 102 and 104, as described, can be substantially any type of base station or mobile device (including not only an independently powered device, but also a modem, for example) that provides wireless network access, and/or portion thereof. In addition, wireless device 106 can be a mobile device or other device that receives wireless network access. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the access point 102 can be present in access point 104.

Access point 102 can include carrier 1 transmitting component 302 that communicates with wireless device 106 (or one or more disparate wireless devices) over a first wireless communication frequency carrier, carrier 2 transmitting component 304 that communicates over a second wireless communication frequency carrier, and an anchor carrier assigning component 306 that assigns the first or second carrier as an anchor carrier for wireless device 106 (or one or more disparate wireless devices). Access point 104 includes a carrier 1 transmitting component 302 that communicates with wireless device 106 (or one or more disparate wireless devices) over the first wireless communication frequency carrier. Wireless device 106 can include an anchor carrier receiving component 308 that receives communications from an access point over an anchor carrier, a secondary carrier receiving component 310 that receives communications from the access point over a secondary carrier, an anchor carrier measuring component 202 that generates intra-frequency measurement reports for the anchor carrier, a secondary carrier measuring component 204 that generates intra-frequency measurement reports for the secondary carrier, and a measurement reporting component 206 that provides the measurement reports to an access point.

According to an example, wireless device 106 can request a connection to the access point 102 (e.g., as part of a reselection procedure, initial communication establishment, and/or the like). Anchor carrier assigning component 306 can select a first carrier (carrier 1) or second carrier (carrier 2) as an anchor carrier for the wireless device 106, and the wireless device can establish connection with access point 102 over the anchor carrier. Anchor carriers, as described, can be utilized for transmitting sensitive data, such as control data, and can be regarded as reliable carriers for a given access point. Secondary carriers can be utilized primarily to provide additional data communications to facilitate multicarrier communications. In this example, access point 102 can assign carrier 2 as the anchor carrier for wireless device 106; this can be based at least in part on loading for a cell within which wireless device 106 communicates with the access point 102, request from the wireless device 106 to utilize carrier 2, and/or the like. In addition, anchor carrier assigning component 306 can switch anchor carrier assignments for a wireless device during communications therewith.

Carrier 1 transmitting component 302 can transmit signals over carrier 1, and carrier 2 transmitting component 304 can transmit signals to the wireless device 106 over carrier 2 (the anchor carrier in this example). Anchor carrier receiving component 308 can receive the transmissions over carrier 2, and secondary carrier receiving component 310 can receive the transmissions over carrier 1. Anchor carrier measuring component 202 can perform intra-frequency measurements on signals received over the anchor carrier by the anchor carrier receiving component 308. This can include evaluating signal quality of the access point 102 over the anchor carrier, analyzing signals and/or quality thereof for disparate access points over the anchor carrier, etc. The measurements, for example, can be performed when anchor carrier receiving component 308 is not receiving signals transmitted by carrier 2 transmitting component 304 (e.g., when decoding/demodulating received transmissions, and/or the like). Measurement reporting component 206 can transmit anchor carrier measurement reports to the access point 102 to facilitate mobility. Thus, for example, access point 102 can analyze the list to determine when to initiate cell reselection for the wireless device 106.

In addition, secondary carrier measuring component 204 can similarly perform intra-frequency measurements on signals received over the secondary carrier by the secondary carrier receiving component 310. Similarly, the secondary carrier measuring component 204 can perform the measurements when the secondary carrier receiving component 310 is not receiving signals from the carrier 1 transmitting component 302. Secondary carrier measuring component 204 can perform intra-frequency measurements based at least in part on anchor carrier measuring component 202 performing one or more measurements. As described, for example, secondary carrier measuring component 204 can perform the intra-frequency measurements when the anchor carrier measuring component 202 performs its measurements. This can occur according to secondary carrier measuring component 204 receiving an event or request based on an event or request received by the wireless device 106 to provide anchor carrier measurement reports, based on a time for generating anchor carrier measurement reports, etc. In another example, secondary carrier measuring component 204 can detect that anchor carrier measuring component 202 performed its measurement and/or the measurement reporting component 206 transmitted an anchor carrier measurement, and can perform measurement over the second carrier based on this information. In any case, measurement reporting component 206 can also transmit secondary carrier measurement reports to the access point 102 (e.g., along with the anchor carrier measurement reports or separately).

Since access point 102 can be provided with current anchor and secondary carrier measurement reports (e.g., because secondary measurement reports are sent based on the anchor carrier measurement reports), access point 102 can evaluate the measurement reports for carrier 1 and carrier 2 to determine whether wireless device 106 should reselect to a disparate access point. In the example depicted, access point 104 has only a carrier 1 transmitting component 302 (e.g., because access point 104 or a related sector does not provide multicarrier communications, has temporarily lost carrier 2, or substantially any other reason). Although carrier 1 is the secondary carrier allocated to the wireless device, it is still measured frequently such that access point 102 can consider access point 104 for cell reselection by the wireless device 106. It is to be appreciated that where wireless device 106 is communicating with access point 104 over carrier 1 (which can be the anchor carrier), and secondary carrier receiving component 310 is not receiving from the access point 104, secondary carrier measuring component 204 can still generate measurement reports for carrier 2 (or one or more other adjacent carriers), as described.

Moreover, with access point 102 possessing measurement reports for both carriers, wireless device 106 need not operate in compressed mode to perform inter-frequency measurements on the adjacent carriers. Additionally, more frequent secondary carrier measurement reports can offer additional benefits, as described, such as enhanced network deployment and optimization, dimensioning in wireless networks, improved handover algorithm generation, more accurate device positioning, etc. In one example, measurement reporting component 206, or one or more disparate components of wireless device 106, can additionally signal to access point 102 (and/or access point 104), that it can measure the second carrier using secondary carrier receiving component 310. In this regard, access point 102 (and/or 104) can avoid utilizing compressed mode with the wireless device 106. In this regard, anchor carrier assigning component 306, and/or one or more components of the access point 102, can signal indications of cells on secondary carriers for measuring to the wireless device. Secondary carrier measuring component 204 can accordingly measure the cells.

Figure 4:
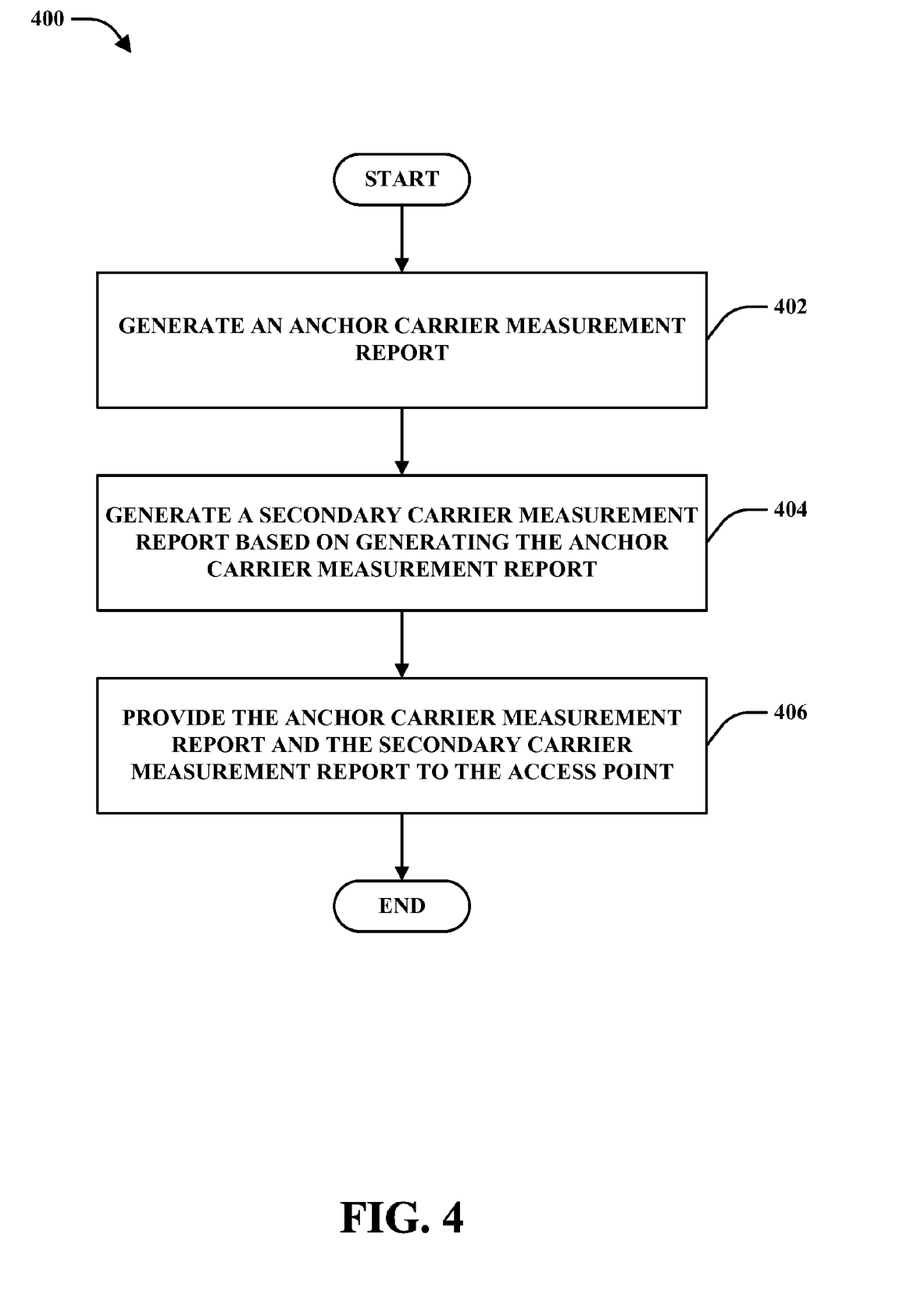
FIG. 4 is a flow diagram of an example methodology that provides secondary carrier and anchor carrier measurement reports.

Referring now to FIG. 4, a methodology that can be performed in accordance with various aspects set forth herein is illustrated. While, for purposes of simplicity of explanation, the methodology is shown and described as a series of acts, it is to be understood and appreciated that the methodology is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 4, illustrated is a methodology 400 for providing frequent secondary carrier measurement reports. At 402, an anchor carrier measurement report can be generated. As described, the anchor carrier can be assigned by an access point to facilitate communicating with the access point. The report can be generated based at least in part on a received event to generate the report (which can be time based or based on other occurrences, for example), a request from one or more network components to generate the report, and/or the like. At 404, a secondary carrier measurement report can be generated based on generating the anchor carrier measurement report. As described, the secondary carrier can be adjacent to the anchor carrier.

In one example, the secondary carrier can be assigned to provide multicarrier communications; however, measurement reports can be generated for the secondary carrier without it being assigned for communications. In addition, the secondary carrier measurement report can be generated based on the event, request, etc. that causes the anchor carrier measurement report to be generated, as described. At 406, the anchor carrier measurement report and the secondary carrier measurement report can be provided to the access point. The measurement reports can be provided to the access point in a single message or separately. Moreover, providing the frequent secondary carrier measurement reports allows the access point to provide effective mobility over both carriers, in one example.

It will be appreciated that, in accordance with one or more aspects described herein, inferences can be made regarding determining when to generate a secondary carrier measurement report based on the anchor carrier measurement report, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
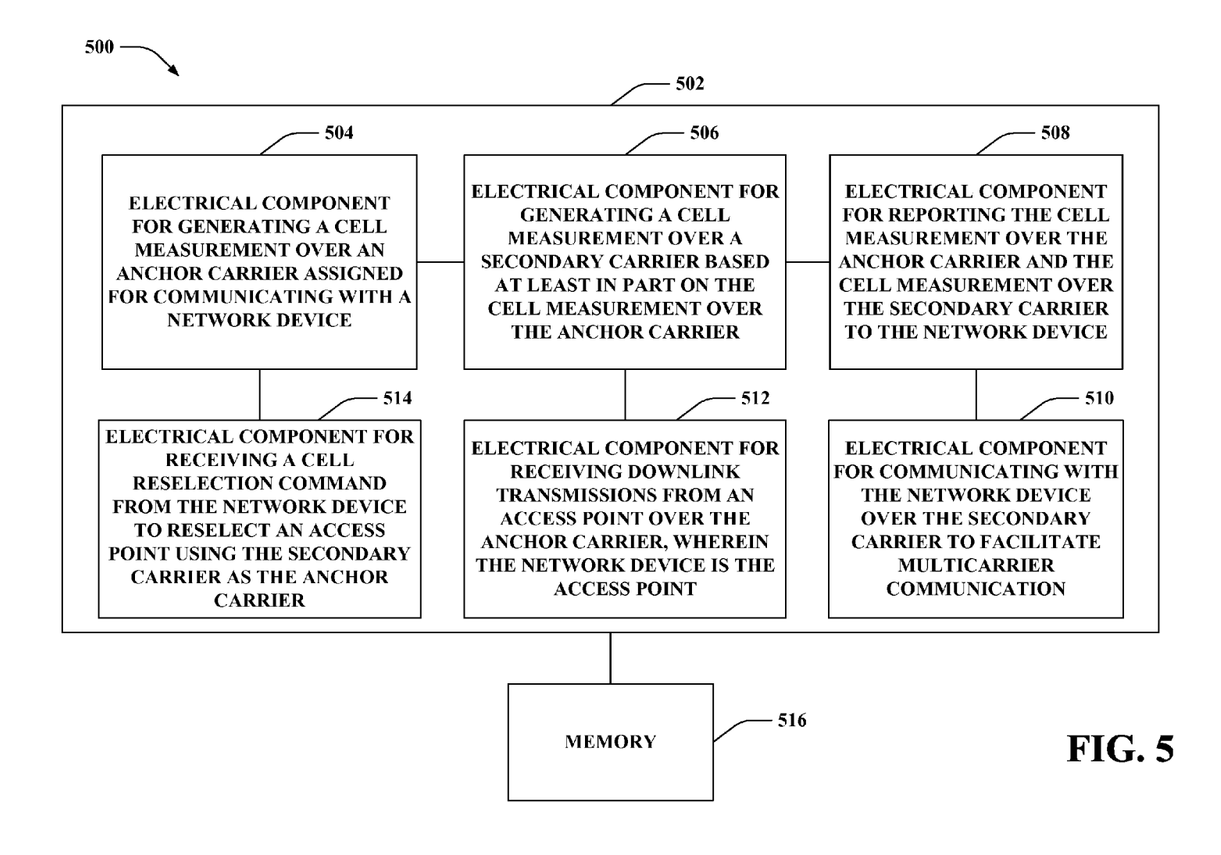
FIG. 5 is a block diagram of an example apparatus that generates secondary carrier measurement reports along with anchor carrier measurement reports.

With reference to FIG. 5, illustrated is a system 500 that provides frequent secondary measurement reports to facilitate improved mobility in multicarrier wireless communications. For example, system 500 can reside at least partially within a base station, mobile device, or another device that provides access to a wireless network. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component for generating a cell measurement over an anchor carrier assigned for communicating with a network device 504. As described, cell measurements can include evaluating a current quality of communicating with the network device, analyzing signals from other network devices transmitting over the anchor carrier, determining interference over the carrier, and/or the like. Further, logical grouping 502 can comprise an electrical component for generating a cell measurement over a secondary carrier based at least in part on the cell measurement over the anchor carrier 506. For example, the cell measurement over the secondary carrier can be performed along with that for the anchor carrier (e.g., based on the event causing measurement over the anchor carrier), as described.

Furthermore, logical grouping 502 can include an electrical component for reporting the cell measurement over the anchor carrier and the cell measurement over the secondary carrier to the network device 508. Thus, the network device can possess measurements over both carriers (and/or additional carriers) to facilitate effective mobility. Moreover, logical grouping 502 can include an electrical component for communicating with the network device over the secondary carrier to facilitate multicarrier communication 510. Further, logical grouping 502 can include an electrical component for receiving downlink transmissions from an access point over the carrier, wherein the network device is the access point 512. As described, the anchor carrier can be used to communicate sensitive data, such as control data. Additionally, logical grouping 502 can include an electrical component for receiving a cell reselection command from the network device to reselect an access point using the secondary carrier as the anchor carrier 514. Frequent measurement reports for the secondary carrier can ensure the network device has current measurement information to initiate such reselection over the secondary carrier. Additionally, system 500 can include a memory 516 that retains instructions for executing functions associated with electrical components 504, 506, 508, 510, 512, and 514. While shown as being external to memory 516, it is to be understood that one or more of electrical components 504, 506, 508, 510, 512, and 514 can exist within memory 516.

Figure 6:
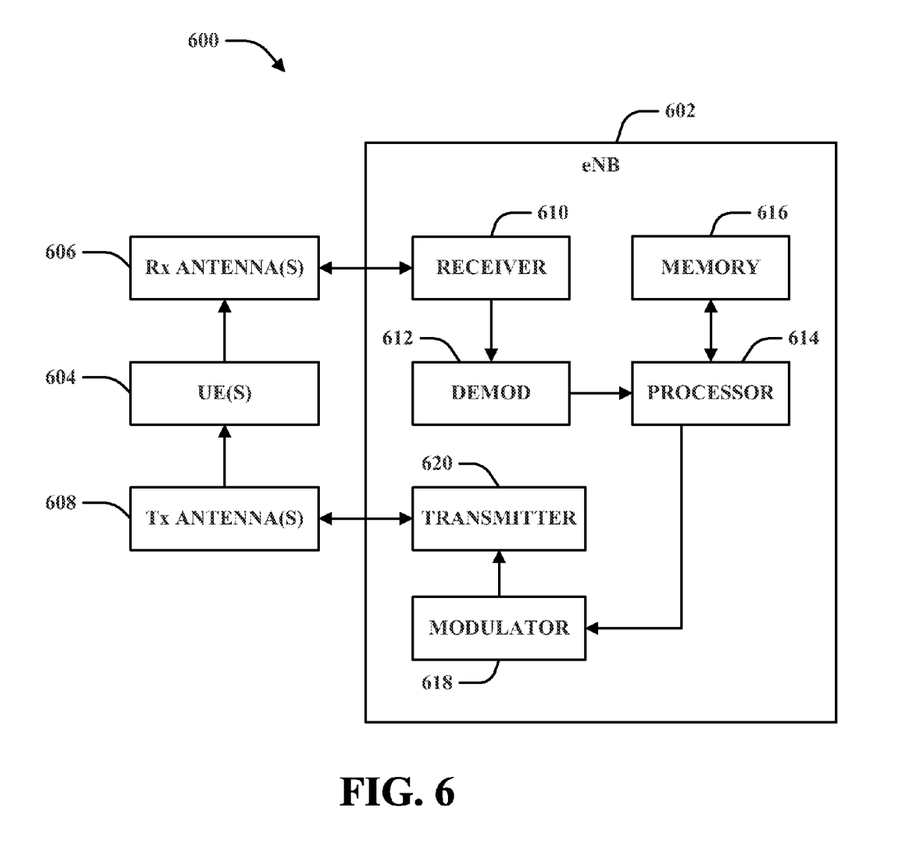
FIGS. 6-7 are block diagrams of example wireless communication devices that can be utilized to implement various aspects of the functionality described herein.

FIG. 6 is a block diagram of a system 600 that can be utilized to implement various aspects of the functionality described herein. In one example, system 600 includes a base station or eNB 602. As illustrated, eNB 602 can receive signal(s) from one or more UEs 604 via one or more receive (Rx) antennas 606 and transmit to the one or more UEs 604 via one or more transmit (Tx) antennas 608. Additionally, eNB 602 can comprise a receiver 610 that receives information from receive antenna(s) 606. In one example, the receiver 610 can be operatively associated with a demodulator (Demod) 612 that demodulates received information. Demodulated symbols can then be analyzed by a processor 614. Processor 614 can be coupled to memory 616, which can store information related to code clusters, access terminal assignments, lookup tables related thereto, unique scrambling sequences, and/or other suitable types of information. In one example, eNB 602 can employ processor 614 to perform methodologies 400 and/or other similar and appropriate methodologies. eNB 602 can also include a modulator 618 that can multiplex a signal for transmission by a transmitter 620 through transmit antenna(s) 608.

Figure 7:
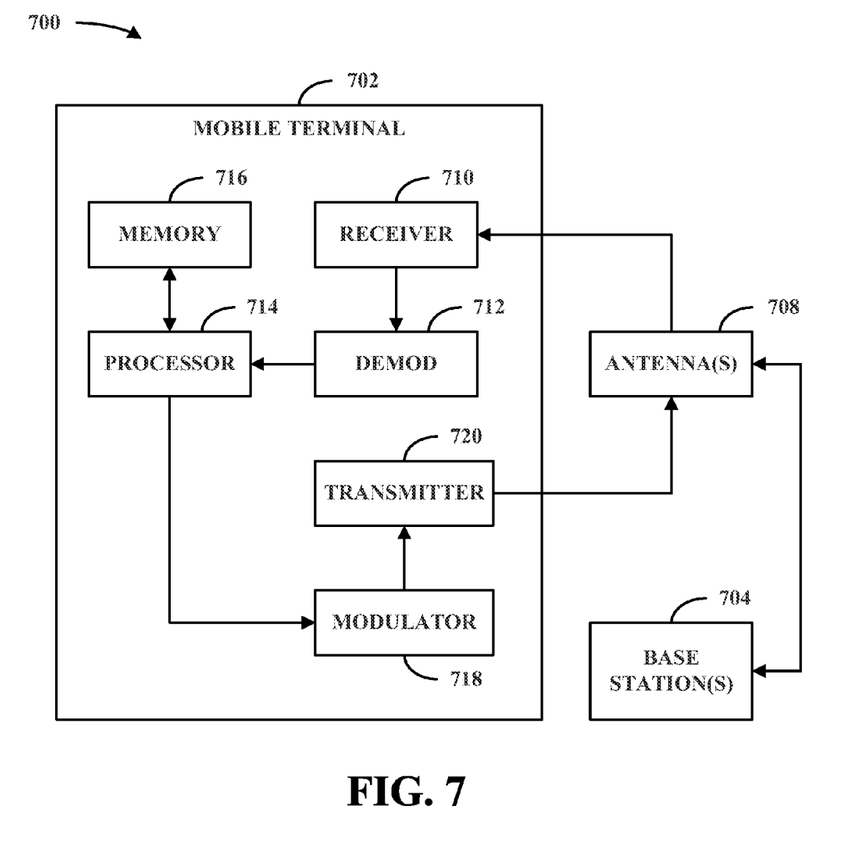

FIG. 7 is a block diagram of another system 700 that can be utilized to implement various aspects of the functionality described herein. In one example, system 700 includes a mobile terminal 702. As illustrated, mobile terminal 702 can receive signal(s) from one or more base stations 704 and transmit to the one or more base stations 704 via one or more antennas 708. Additionally, mobile terminal 702 can comprise a receiver 710 that receives information from antenna(s) 708. In one example, receiver 710 can be operatively associated with a demodulator (Demod) 712 that demodulates received information. Demodulated symbols can then be analyzed by a processor 714. Processor 714 can be coupled to memory 716, which can store data and/or program codes related to mobile terminal 702. Additionally, mobile terminal 702 can employ processor 714 to perform methodologies 400 and/or other similar and appropriate methodologies. Mobile terminal 702 can also employ one or more components described in previous figures to effectuate the described functionality; in one example, the components can be implemented by the processor 714. Mobile terminal 702 can also include a modulator 718 that can multiplex a signal for transmission by a transmitter 720 through antenna(s) 708.

Figure 8:
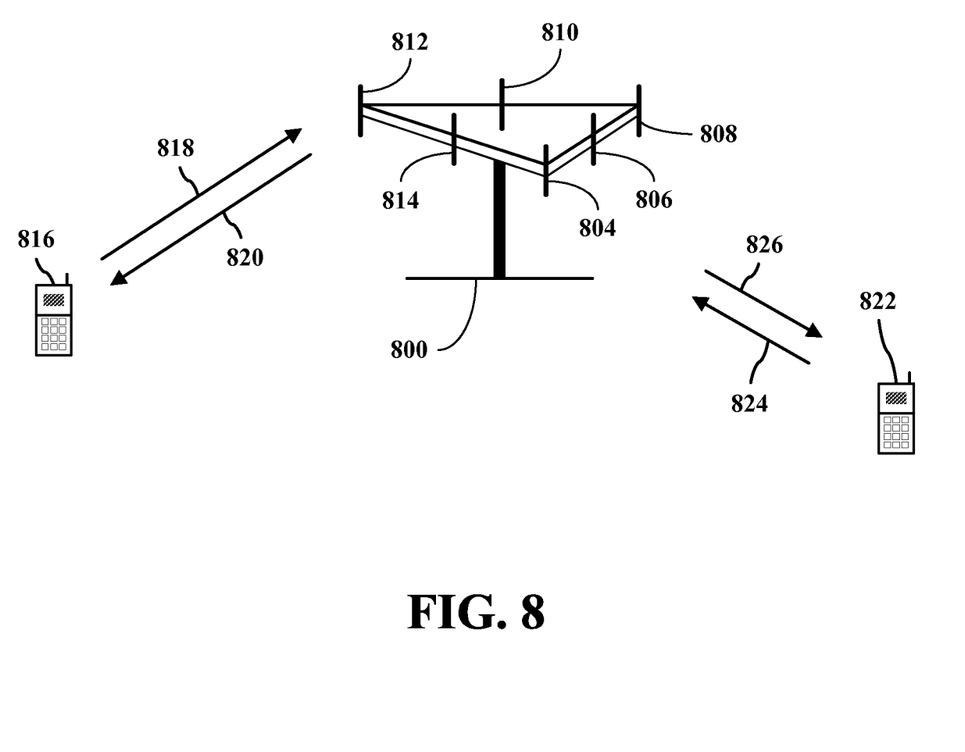
FIG. 8 illustrates an example wireless multiple-access communication system in accordance with various aspects set forth herein.

Referring now to FIG. 8, an illustration of a wireless multiple-access communication system is provided in accordance with various aspects. In one example, an access point 800 (AP) includes multiple antenna groups. As illustrated in FIG. 8, one antenna group can include antennas 804 and 806, another can include antennas 808 and 810, and another can include antennas 812 and 814. While only two antennas are shown in FIG. 8 for each antenna group, it should be appreciated that more or fewer antennas may be utilized for each antenna group. In another example, an access terminal 816 can be in communication with antennas 812 and 814, where antennas 812 and 814 transmit information to access terminal 816 over forward link 820 and receive information from access terminal 816 over reverse link 818. Additionally and/or alternatively, access terminal 822 can be in communication with antennas 806 and 808, where antennas 806 and 808 transmit information to access terminal 822 over forward link 826 and receive information from access terminal 822 over reverse link 824. In a frequency division duplex system, communication links 818, 820, 824 and 826 can use different frequency for communication. For example, forward link 820 may use a different frequency then that used by reverse link 818.

Each group of antennas and/or the area in which they are designed to communicate can be referred to as a sector of the access point. In accordance with one aspect, antenna groups can be designed to communicate to access terminals in a sector of areas covered by access point 800. In communication over forward links 820 and 826, the transmitting antennas of access point 800 can utilize beamforming in order to improve the signal-to-noise ratio of forward links for the different access terminals 816 and 822. Also, an access point using beamforming to transmit to access terminals scattered randomly through its coverage causes less interference to access terminals in neighboring cells than an access point transmitting through a single antenna to all its access terminals.

An access point, e.g., access point 800, can be a fixed station used for communicating with terminals and can also be referred to as a base station, an eNB, an access network, and/or other suitable terminology. In addition, an access terminal, e.g., an access terminal 816 or 822, can also be referred to as a mobile terminal, user equipment, a wireless communication device, a terminal, a wireless terminal, and/or other appropriate terminology.

Figure 9:
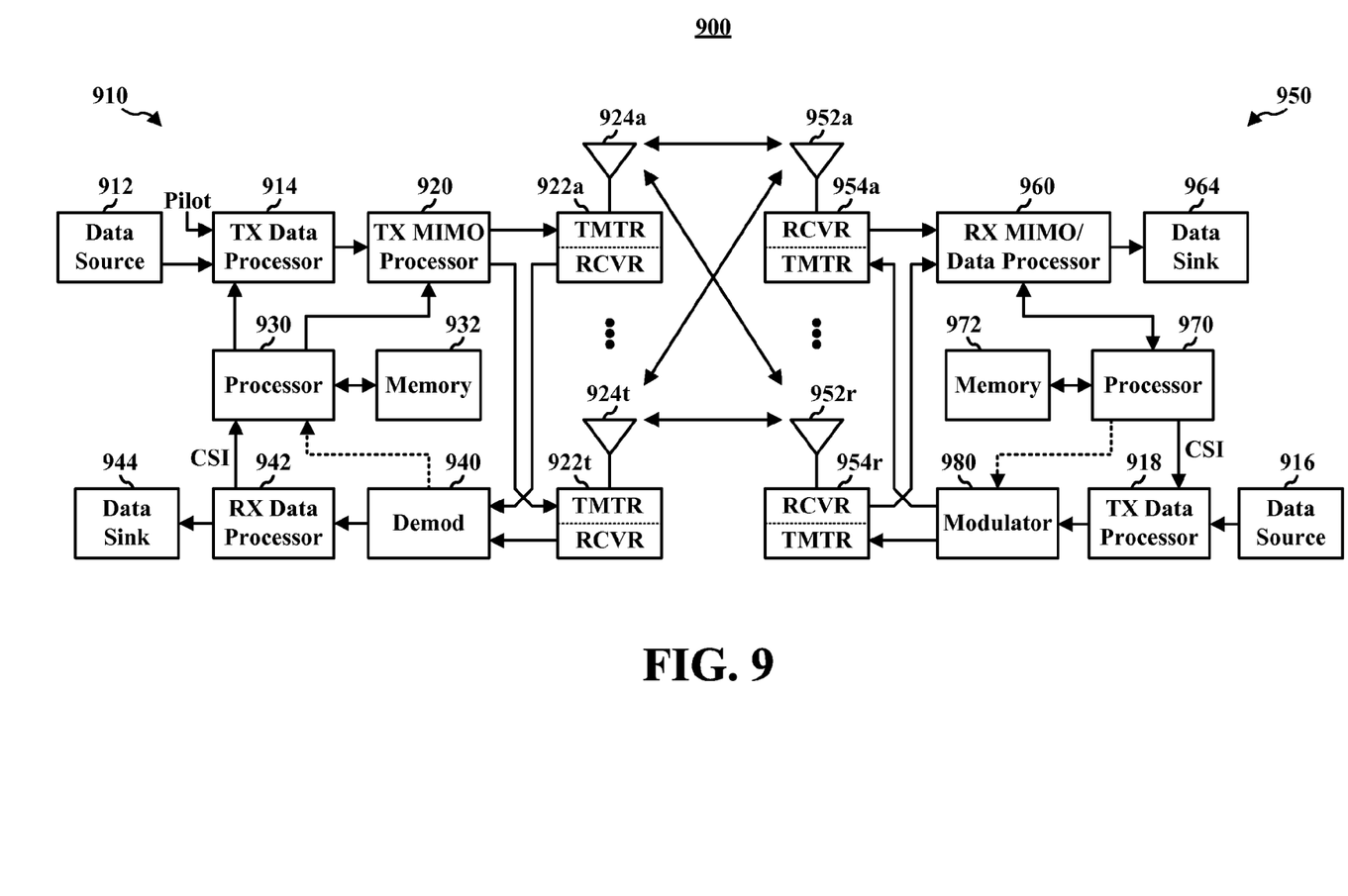
FIG. 9 is a block diagram illustrating an example wireless communication system in which various aspects described herein can function.

Referring now to FIG. 9, a block diagram illustrating an example wireless communication system 900 in which various aspects described herein can function is provided. In one example, system 900 is a multiple-input multiple-output (MIMO) system that includes a transmitter system 910 and a receiver system 950. It should be appreciated, however, that transmitter system 910 and/or receiver system 950 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 910 and/or receiver system 950 described herein could be utilized in connection with a single output to single input antenna system.

In accordance with one aspect, traffic data for a number of data streams are provided at transmitter system 910 from a data source 912 to a transmit (TX) data processor 914. In one example, each data stream can then be transmitted via a respective transmit antenna 924. Additionally, TX data processor 914 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 950 to estimate channel response. Back at transmitter system 910, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 930.

Next, modulation symbols for all data streams can be provided to a TX processor 920, which can further process the modulation symbols (e.g., for OFDM). TX MIMO processor 920 can then provides $N_T$ modulation symbol streams to $N_T$ transceivers 922a through 922t. In one example, each transceiver 922 can receive and process a respective symbol stream to provide one or more analog signals. Each transceiver 922 can then further condition (e.g., amplify, filter, and upconvert) the analog signals to provide a modulated signal suitable for transmission over a MIMO channel. Accordingly, $N_T$ modulated signals from transceivers 922a through 922t can then be transmitted from $N_T$ antennas 924a through 924t, respectively.

In accordance with another aspect, the transmitted modulated signals can be received at receiver system 950 by $N_R$ antennas 952a through 952r. The received signal from each antenna 952 can then be provided to respective transceivers 954. In one example, each transceiver 954 can condition (e.g., filter, amplify, and downconvert) a respective received signal, digitize the conditioned signal to provide samples, and then processes the samples to provide a corresponding "received" symbol stream. An RX MIMO/data processor 960 can then receive and process the $N_R$ received symbol streams from $N_R$ transceivers 954 based on a particular receiver processing technique to provide $N_T$ "detected" symbol streams. In one example, each detected symbol stream can include symbols that are estimates of the modulation symbols transmitted for the corresponding data stream. RX processor 960 can then process each symbol stream at least in part by demodulating, deinterleaving, and decoding each detected symbol stream to recover traffic data for a corresponding data stream. Thus, the processing by RX processor 960 can be complementary to that performed by TX MIMO processor 920 and TX data processor 916 at transmitter system 910. RX processor 960 can additionally provide processed symbol streams to a data sink 964.

In accordance with one aspect, the channel response estimate generated by RX processor 960 can be used to perform space/time processing at the receiver, adjust power levels, change modulation rates or schemes, and/or other appropriate actions. Additionally, RX processor 960 can further estimate channel characteristics such as, for example, signal-to-noise-and-interference ratios (SNRs) of the detected symbol streams. RX processor 960 can then provide estimated channel characteristics to a processor 970. In one example, RX processor 960 and/or processor 970 can further derive an estimate of the "operating" SNR for the system. Processor 970 can then provide channel state information (CSI), which can comprise information regarding the communication link and/or the received data stream. This information can include, for example, the operating SNR. The CSI can then be processed by a TX data processor 918, modulated by a modulator 980, conditioned by transceivers 954a through 954r, and transmitted back to transmitter system 910. In addition, a data source 916 at receiver system 950 can provide additional data to be processed by TX data processor 918.

Back at transmitter system 910, the modulated signals from receiver system 950 can then be received by antennas 924, conditioned by transceivers 922, demodulated by a demodulator 940, and processed by a RX data processor 942 to recover the CSI reported by receiver system 950. In one example, the reported CSI can then be provided to processor 930 and used to determine data rates as well as coding and modulation schemes to be used for one or more data streams. The determined coding and modulation schemes can then be provided to transceivers 922 for quantization and/or use in later transmissions to receiver system 950. Additionally and/or alternatively, the reported CSI can be used by processor 930 to generate various controls for TX data processor 914 and TX MIMO processor 920. In another example, CSI and/or other information processed by RX data processor 942 can be provided to a data sink 944.

In one example, processor 930 at transmitter system 910 and processor 970 at receiver system 950 direct operation at their respective systems. Additionally, memory 932 at transmitter system 910 and memory 972 at receiver system 950 can provide storage for program codes and data used by processors 930 and 970, respectively. Further, at receiver system 950, various processing techniques can be used to process the NR received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    concurrently generating an anchor carrier measurement report and a secondary carrier measurement report in response to receiving an event or a request to generate the anchor carrier measurement report, wherein the anchor carrier measurement report includes information obtained for an anchor carrier assigned by one or more network devices related to quality of communications over the anchor carrier using a primary receiver, and the secondary carrier measurement report includes information obtained for a secondary carrier adjacent to the anchor carrier using a secondary receiver;
    providing the anchor carrier measurement report and the secondary carrier measurement report to the one or more network devices; and
    signaling a presence of the secondary receiver to the one or more network devices to avoid compressed mode communications.

2. The method of claim 1, wherein the generating the secondary carrier measurement report includes detecting the generating of the anchor carrier measurement report.

3. The method of claim 1, further comprising communicating with the one or more network devices over the secondary carrier to facilitate multicarrier communication.

4. The method of claim 1, further comprising receiving downlink transmissions from an access point over the anchor carrier, wherein the access point is at least one of the one or more network devices.

5. The method of claim 1, further comprising receiving a command from the one or more network devices to reselect an access point using the secondary carrier as the anchor carrier.

6. The method of claim 1, further comprising receiving an indication of one or more cells operating on the secondary carrier from an access point, wherein the generating the secondary carrier measurement report includes measuring the one or more cells.

7. A wireless communications apparatus, comprising:
    at least one processor configured to:
        concurrently perform a cell measurement over an anchor carrier and a secondary carrier, respectively, in response to receiving an event or a request to generate an anchor carrier measurement report, wherein the anchor carrier is assigned for communicating with a network device and the secondary carrier adjacent to the anchor carrier;
        report the cell measurement over the anchor carrier and the cell measurement over the secondary carrier to the network device; and
        signal a presence of the secondary receiver to the one or more network devices to avoid compressed mode communications; and
    a memory coupled to the at least one processor.

8. The wireless communications apparatus of claim 7, wherein the at least one processor is further configured to detect the event or the request related to performing the cell measurement over the anchor carrier.

9. The wireless communications apparatus of claim 7, wherein the at least one processor is further configured to detect performing the cell measurement over the anchor carrier.

10. The wireless communications apparatus of claim 7, wherein the at least one processor is further configured to additionally communicate with the network device over the secondary carrier to receive multicarrier wireless access.

11. The wireless communications apparatus of claim 7, wherein the at least one processor is further configured to receive downlink transmissions from an access point over the anchor carrier, wherein the access point is the network device.

12. The wireless communications apparatus of claim 7, wherein the at least one processor is further configured to receive a command from the network device to reselect a cell provided by an access point using the secondary carrier as the anchor carrier for reselection.

13. An apparatus, comprising:
    means for concurrently generating a cell measurement over an anchor carrier and a cell measurement over a secondary carrier in response to receiving an event or a request to generate an anchor carrier measurement report, wherein the anchor carrier is assigned for communicating with a network device and the secondary carrier adjacent to the anchor carrier;

means for reporting the cell measurement over the anchor carrier and the cell measurement over the secondary carrier to the network device; and means for signaling a presence of the secondary receiver to the one or more network devices to avoid compressed mode communications.

14. The apparatus of claim 13, further comprising means for detecting the cell measurement over the anchor carrier.

15. The apparatus of claim 13, further comprising means for communicating with the network device over the secondary carrier to facilitate multicarrier communication.

16. The apparatus of claim 13, further comprising means for receiving downlink transmissions from an access point over the anchor carrier, wherein the network device is the access point.

17. The apparatus of claim 16, wherein the means for receiving downlink transmissions receives an indication of one or more cells operating on the secondary carrier from the access point, wherein the means for generating the secondary carrier measurement report measures the one or more cells.

18. The apparatus of claim 13, further comprising means for receiving a cell reselection command from the network device to reselect an access point using the secondary carrier as the anchor carrier.

19. A non-transitory computer-readable medium comprising:

code for causing at least one computer to:

generate an anchor carrier measurement report and a secondary carrier measurement report in response to receiving an event or a request to generate the anchor carrier measurement report, wherein the anchor carrier measurement report includes information obtained for an anchor carrier assigned by one or more network devices related to quality of communications over the anchor carrier using a primary receiver, and the secondary carrier measurement report includes information obtained for a secondary carrier adjacent to the anchor carrier using a secondary receiver;

provide the anchor carrier measurement report and the secondary carrier measurement report to the one or more network devices; and signal a presence of the secondary receiver to the one or more network devices to avoid compressed mode communications.

20. The computer program product of claim 19, wherein the computer-readable medium further comprises code for causing the at least one computer to detect the generating of the anchor carrier measurement report.

21. The computer-readable medium of claim 19, wherein the computer-readable medium further comprises code for causing the at least one computer to communicate with the one or more network devices over the secondary carrier to facilitate multicarrier communication.

22. The computer-readable medium of claim 19, wherein the computer-readable medium further comprises code for causing the at least one computer to receive downlink transmissions from an access point over the anchor carrier, wherein the access point is at least one of the one or more network devices.

23. The computer-readable medium of claim 19, wherein the computer-readable medium further comprises code for causing the at least one computer to receive a command from the one or more network devices to reselect an access point using the secondary carrier as the anchor carrier.

24. An apparatus, comprising:

an anchor carrier measuring component, comprising hardware, that generates a cell measurement over an anchor carrier assigned for communicating with a network device in response to receiving an event or a request to generate the anchor carrier measurement report;

a secondary carrier measuring component that concurrently generates a cell measurement over a secondary carrier in response to receiving the event or the request to generate the anchor carrier measurement report and the generating of the cell measurement over the anchor carrier; and a measurement reporting component that provides the cell measurement over the anchor carrier and the cell measurement over the secondary carrier to the network device, and signals a presence of the secondary receiver to the one or more network devices to avoid compressed mode communications.

25. The apparatus of claim 24, wherein the secondary carrier measuring component is configured to detect the cell measurement over the anchor carrier.

26. The apparatus of claim 24, further comprising a secondary carrier receiving component that communicates with the network device over the secondary carrier to facilitate multicarrier communication.

27. The apparatus of claim 24, further comprising an anchor carrier receiving component that receives downlink transmissions from an access point over the anchor carrier, wherein the network device is the access point.

28. The apparatus of claim 24, further comprising an anchor carrier receiving component that obtains a cell reselection command from the network device to reselect an access point using the secondary carrier as the anchor carrier.

* * * * *